United States Patent Office 3,165,394
Patented Jan. 12, 1965

3,165,394
PROCESS FOR MAKING AN ODOURLESS CATTLE MANURE COMPOST
Anders Ruben Rausing, Simontorps Sateri, Blentarp, Sweden
No Drawing. Filed Feb. 25, 1963, Ser. No. 260,839
2 Claims. (Cl. 71—8)

This invention relates to fertilizers and soil conditioners, and more particularly to cattle manure compost and a process for making such compost.

In all highly developed countries it is a matter of difficulty for gardeners and florists, both professional and amateur, to obtain cattle manure inasmuch as the odour thereof hitherto has constituted a serious obstacle to the marketing of the manure in the retail trade. Both retailers and consumers have refused to deal with such a commodity.

One object of this invention is to produce a compost from cow or like manure suitable for packaging to the trade, which will not only be rich in nitrogen, phosphorus and other organic matter, but will also effectively activate and revitalize soil.

With this end in view the invention consists in a method of making an odourless compost from cattle manure as a base, wherein cattle manure is mixed with peat moss litter and allowed to break down in the presence of air and by the action of bacteria, and subsequently, in order substantially to increase the dry substance contents of the compost thus obtained and to make it odourless, adding further peat moss litter thereto having an admixture of fertilizer such as superphosphate, nitro-chalk or the like and allowing such newly added peat moss litter to break down in the presence of air and through the action of bacteria.

Material produced by the aforesaid method may be in the form of a loam-like manure compost of humus which will be entirely decomposed and odourless. This organic compost may include manure mixed with peat moss litter treated in a predetermined way, whereby all matter is broken down into soft crumbly loam-like particles, whereby the compost can be effectively spread over all the soil or mixed with the same.

The method of manufacture may include the steps of adding dry peat moss litter to the manure for the control of moisture and storing the mixture in open basins or the like; turning and working the mixture to aerate it and to control the decomposition of all matter; adding further dry peat moss litter and other materials to the mixture to increase the dry substance contents thereof and storing the mixture thus obtained for the decomposition of all new matter added; and finally, upon complete decomposition, bagging the mixture for sale.

The invention will be clearly understood from the following description, by way of example, of one method of carrying the invention into effect.

In the making of manure compost in accordance with the invention the following materials are initially used: manure and urine, peat moss litter, fertilizer phosphates and nitro-chalk.

By stabling cattle in sheds having a stall flooring of rubber or similar resilient material requiring no bedding of straw or the like the cattle urine and manure without any admixture may be collected in the manure-gutter and drained away into a large closed receptacle, e.g., a concrete basin. In such a receptacle the mixture of urine and manure is homogenized, e.g., through pumping or stirring, the mixture preferably being covered by an oil surface layer to prevent exposure to air.

The mixture of urine and manure thus prepared only contains such weed seed as has passed through the alimentary canal of the cattle. Weed seed is destroyed if kept in a liquid during several months. Thus, by storing the said mixture of urine and manure for such a period of time a weed-free mixture is obtained.

The substantially liquid, weed-free, mixture is mixed thoroughly with dry peat moss litter and is kept stored during, e.g., 3 to 4 months while exposed to the air, the peat moss litter, in the usual way, breaking down on account of the action of bacteria in the presence of nitrogen. During the storing the compost is turned and worked, e.g., by shovel, on two or more occasions in order further to aerate it.

Even when its peat moss litter component has broken down completely this compost is not odourless but has the odour of ordinary cattle manure. In order to eliminate such odour and to produce an odourless compost there is added to the compost, by high speed mincing or slicing, e.g., by means of rotating blades or knives, dry peat moss litter having an admixture of, in the first place, fertilizer phosphate such as superphosphate, and nitrogen such as nitro-chalk, so that the dry substance percentage is increased up to about 30 to 35 percent. The mixture thus obtained is light and fluffy and is conveyed by blowing or by other means into heaps which are stored for sufficient time to make the newly added peat moss litter break down.

After 1 to 3 months, when the peat moss litter has broken down sufficiently in the milieu above described, the compost is finished, being entirely odourless. When packaged, e.g., in plastic bags, it lends itself to marketing even in the provisional-dealer's shops.

I claim:
1. The method of making an odourless compost which comprises the steps of collecting a natural mixture of cattle manure and urine, mixing the manure and urine to obtain a substantially liquid product, storing said liquid product several months to effect the destruction of any weed seed contained therein, thoroughly mixing said weed-free liquid product with dry peat moss, storing said mixture in the presence of air three to four months to effect a breakdown of the peat moss as a result of the action of bacteria in the presence of nitrogen, working said mixture during the storage period in order to aerate the same and establish an initial compost, mixing with said initial compost at high speed a mixture comprising dry peat moss, fertilizer phosphate and nitrogen in such proportions as to obtain a final light and fluffy compost product the dry substances of which constitute from about 30 to 35 percent by weight of said final product, and storing said final compost product one to three months to effect a breakdown of the last added peat moss.

2. The method of making an odourless compost as defined in claim 1 wherein said liquid product of manure and urine is stored in a manner such as to exclude air from the same.

References Cited in the file of this patent
UNITED STATES PATENTS

| | | |
|---|---|---|
| 1,402,102 | Smith | Jan. 3, 1922 |
| 1,938,647 | Earp-Thomas | Dec. 12, 1933 |
| 1,980,244 | Wright | Nov. 13, 1934 |
| 2,750,269 | Klein | June 12, 1956 |
| 2,767,072 | Coanda | Oct. 16, 1956 |
| 2,879,151 | Melville | Mar. 24, 1959 |
| 3,108,868 | Wade | Oct. 29, 1963 |